Oct. 7, 1958  J. P. GREENING  2,855,147
POLYNOMIAL MULTIPLIER

Filed Nov. 12, 1954  4 Sheets-Sheet 1

INVENTOR.
J. P. GREENING
BY Hudson & Young
ATTORNEYS

INVENTOR.
J. P. GREENING
BY Hudson & Young
ATTORNEYS

Oct. 7, 1958 J. P. GREENING 2,855,147
POLYNOMIAL MULTIPLIER

Filed Nov. 12, 1954 4 Sheets-Sheet 3

INVENTOR.
J. P. GREENING
BY *Hudson & Young*
ATTORNEYS

INVENTOR.
J. P. GREENING
BY Hudson & Young
ATTORNEYS

United States Patent Office 2,855,147
Patented Oct. 7, 1958

2,855,147

POLYNOMIAL MULTIPLIER

John P. Greening, Bartlesville, Okla., assignor to Phillips Petroleum Company, a corporation of Delaware Application November 12, 1954, Serial No. 468,360

11 Claims. (Cl. 235—61)

This invention relates to apparatus for generating electrical signals of predetermined wave forms. In another aspect it relates to apparatus for multiplying algebraic polynomials. In still another aspect it relates to an electrical tuning ssytem to detect a particular wave form in the presence of random noise.

In various fields of physical measurement and analysis, the data under consideration can be expressed in the general form of an algebraic polynomial of the type:

$$a_0 + a_1 x + a_2 x^2 + \ldots + a_n x^n \quad (1)$$

where the coefficient $a_0, a_1, a_2 \ldots a_n$ represent the magnitude of the individual quantities under consideration and the quantities $x, x^2 \ldots x^n$ represent time, space or the like at which the respective coefficients $a_1, a_2, \ldots a_n$ are measured with respect to a reference point associated with the coefficient $a_0$. The exponents attached to the several $x$'s serve to identify the time, space or the like at which the respective coefficients are taken. For example, an electrical voltage sine wave of $\pi$ period and unit maximum value can be expressed as follows:

$$0 + 0.7x + 1.0x^2 + 0.7x^3 + 0x^4 - 0.7x^5 - 1.0x^6 - 0.7x^7 + 0x^8 \quad (2)$$

where the coefficients 0.7, 1.0, 0.7, 0, −0.7, −1.0, −0.7 and 0 represent the magnitude of voltage values at respective phase angles of $\pi/8$, $\pi/4$, $3\pi/8$, $\pi/2$, $5\pi/8$, $3\pi/4$, $7\pi/8$ and $\pi$, the latter being represented by the respective quantities $x, x^2, x^3, x^4, x^5, x^6, x^7,$ and $x^8$. By increasing the number of $x$ values within the period $\pi$, the sine curve can be expressed to any desired degree of accuracy. Obviously other mathematical curves, the magnitude of which vary with time, can be expressed in like manner.

In accordance with one aspect of this invention, apparatus is provided for generating electrical signals corresponding to an algebraic polynomial. The individual coefficients are established by the settings of respective potentiometers. A switching arrangement is provided to apply either positive or negative potentials across the end terminals of the individual potentiometers, depending upon the algebraic sign of the particular coefficient. The contactors of the respective potentiometers are connected to respective commutator segments which are engaged sequentially by a moving brush. The sequential potentials appearing on the brush are, therefore, the potentials at the contactors of the individual potentiometers. The electrical signal generated in this manner by the moving brush can be of any predetermined wave form as determined by the contactor settings of the individual potentiometers.

In accordance with another aspect of this invention, apparatus is provided for multiplying one polynomial by another. The first polynomial is established by the contactor settings of potentiometers as described above. The brush is connected electrically in sequence to a plurality of storage devices which can be in the form of condensers or a magnetic tape, for example. A pickup is associated with each of the storage devices to remove the signals applied thereto from the brush. Each of these pickups is connected to the input of a voltage multiplying device. The settings of the voltage multiplying devices are established in accordance with the coefficients of the second polynomial to be multiplied. The outputs of the several voltage multiplying devices are connected to a summing network which provides an output signal representative of the product of the two polynomials being multiplied. This type of multiplication system requires that there be approximately twice as many signal storage units and voltage multiplying units as there are terms in the second polynomial. To overcome this difficulty, there is provided a novel switching arrangement which automatically prevents the output signal from the brush from being repeated on the signal storage units following the initial application of the signal. This prevents the first polynomial from being applied a second time to the storage units during the time that the last half of the product terms are being generated.

The electrical circuits associated with the polynomial multiplying apparatus of this invention are designed to designed to accommodate both positive and negative coefficients in the polynomials to be multiplied. Separate summing circuits are provided for the positve and negative terms. The voltage signal representing the sum of the negative terms is transmitted through a phase inversion network so that the combined negative and output sums can be added to one another and applied to a recorder or other indicating unit.

Accordingly, it is an object of this invention to provide apparatus for generating electrical signals of any desired wave form.

Another object is to provide algebraic polynomial multiplying apparatus using a minimum number of signal storage and multiplying means.

A further object is to provide improved electrical circuits for use in computing devices.

Various other objects, advantages and features of this invention should become apparent from the following detailed description taken in conjunction with the accompanying drawing in which.

Figure 1:
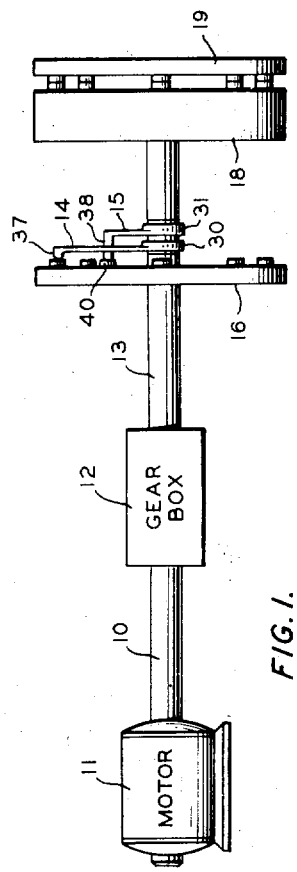
Figure 1 is a schematic representation of the signal generating and computing mechanism of this invention.

Referring now to the drawing in detail and to Figure 1 in particular, there is shown a schematic representation of the mechanical components of the computing mechanism. The drive shaft 10 of a constant speed motor 11 is connected to the input of a gear box 12. The output shaft 13 of gear box 12 thus revolves at a constant predetermined speed. A pair of arms 14 and 15 is mounted on shaft 13 to engage respective contacts on a stationary disc 16 which is mounted concentrically with shaft 13. A second disc 18 is mounted on the end of shaft 13 for rotation therewith. A plurality of contacts is mounted on the face of disc 18 to engage corresponding contacts on the face of a second stationary disc 19.

Figure 2:
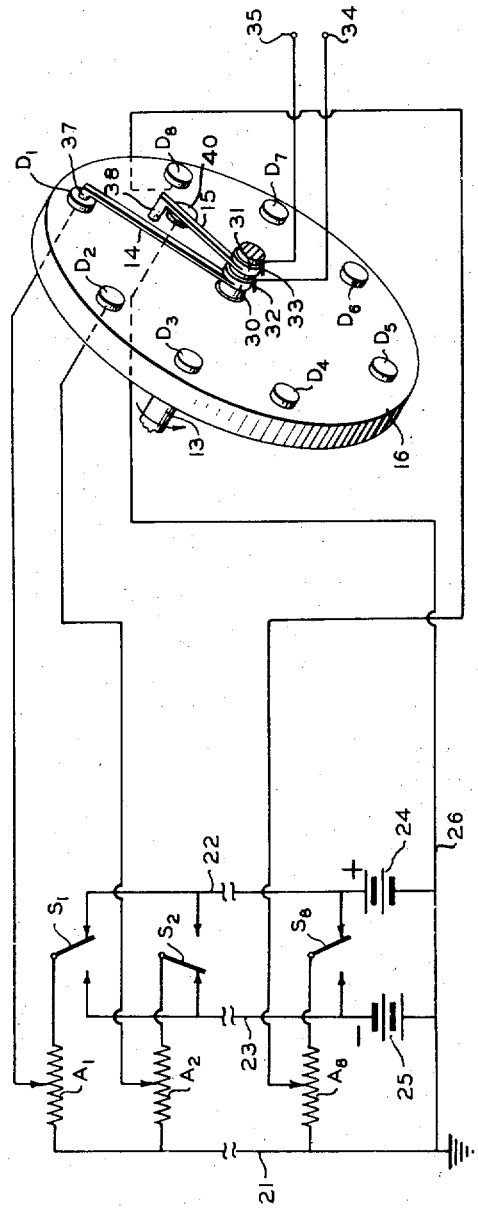
Figure 2 is a schematic circuit diagram of the signal generating portion of the computing apparatus.

The electrical circuit associated with stationary disc 16 is illustrated in Figure 2. Disc 16 has a plurality of electrical contacts $D_1, D_2, \ldots D_8$ mounted on the face thereof in an annular path. While eight contacts are shown for purposes of illustration, it should be evident that more or fewer contacts can be employed as desired.

These contacts $D_1, D_2, \ldots D_8$ are electrically connected to the contactors of respective potentiometers $A_1, A_2, \ldots A_8$. Corresponding first end terminals of these potentiometers are connected to a grounded lead 21, and the second end terminals of potentiometers $A_1, A_2, \ldots A_8$ are connected to the movable blades of respective switches $S_1, S_2, \ldots S_8$. These switches are adapted to engage a lead 22 when moved to the right-hand positions and a lead 23 when moved to the left-hand positions. Lead 22 is connected to the positive terminals of a battery 24 and lead 23 is connected to a negative terminal of a battery 25. The negative terminal of battery 24 and the positive terminal of battery 25 are connected to a grounded lead 26.

Arms 14 and 15 are connected at their inner ends to respective slip rings 30 and 31 on drive shaft 13 which are mounted on shaft 13 by insulating sleeves, not shown. Brushes 32 and 33, which are in contact with respective slip rings 30 and 31, are connected to respective output terminals 34 and 35. The outer ends of arms 14 and 15 terminate in respective brushes 37 and 38. Brush 37 engages contacts $D_1, D_2, \ldots D_8$ sequentially as shaft 13 is rotated in the direction indicated. Brush 38 is adapted to engage an electrical contact 40 on disc 16 once during each revolution of shaft 13. Contact 40 is positioned so as to be engaged by brush 38 during the interval that brush 37 is passing between contacts $D_8$ and $D_1$. Contact 40 is electrically connected to grounded lead 26.

When it is desired to generate a periodic electrical signal of predetermined wave form, the contactors of potentiometer $A_1, A_2, \ldots A_8$ are set so that the voltages appearing thereon are representative of sequential amplitude values of the desired signal to be generated. For those amplitudes that are positive, the associated S switches are connected to lead 22; and for those values which are negative, the associated S switches are connected to lead 23. The output voltage appearing between terminal 34 and ground is thus representative of the voltages removed sequentially from potentiometers $A_1, A_2, \ldots A_8$. By employing a large number of electrical contacts on disc 16, a relatively smooth output signal can be obtained. A filter circuit can be connected to the output terminals for additional smoothing, if desired. Output terminal 35 serves no function when the apparatus is employed solely as a signal generator. The function of this terminal will become apparent from the following description which relates to the operation of the computer network in a polynomial multiplier.

Figure 3:
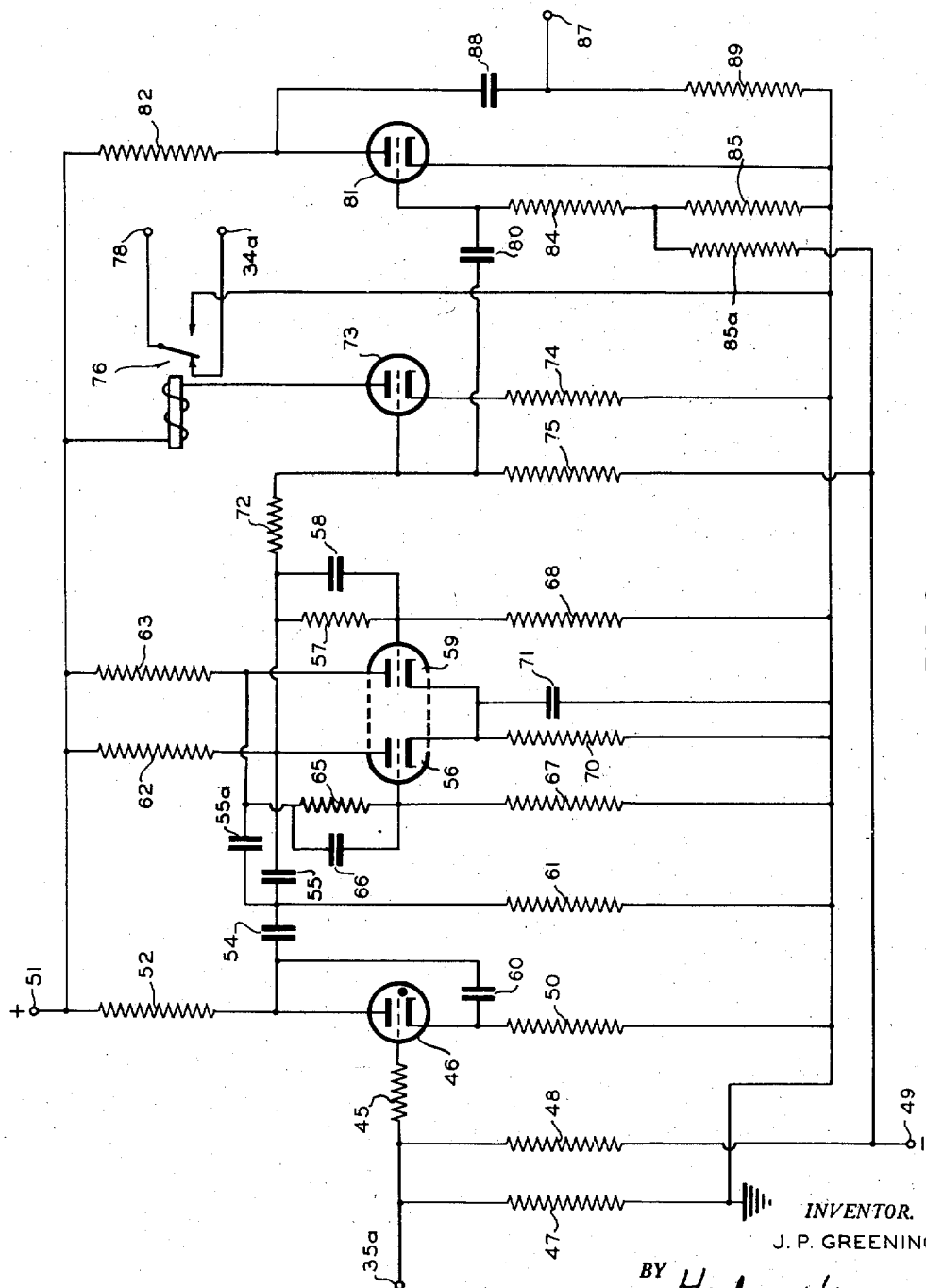
Figure 3 is a schematic circuit diagram of the switching mechanism incorporated between the signal generating and signal storage apparatus.
Figure 4:
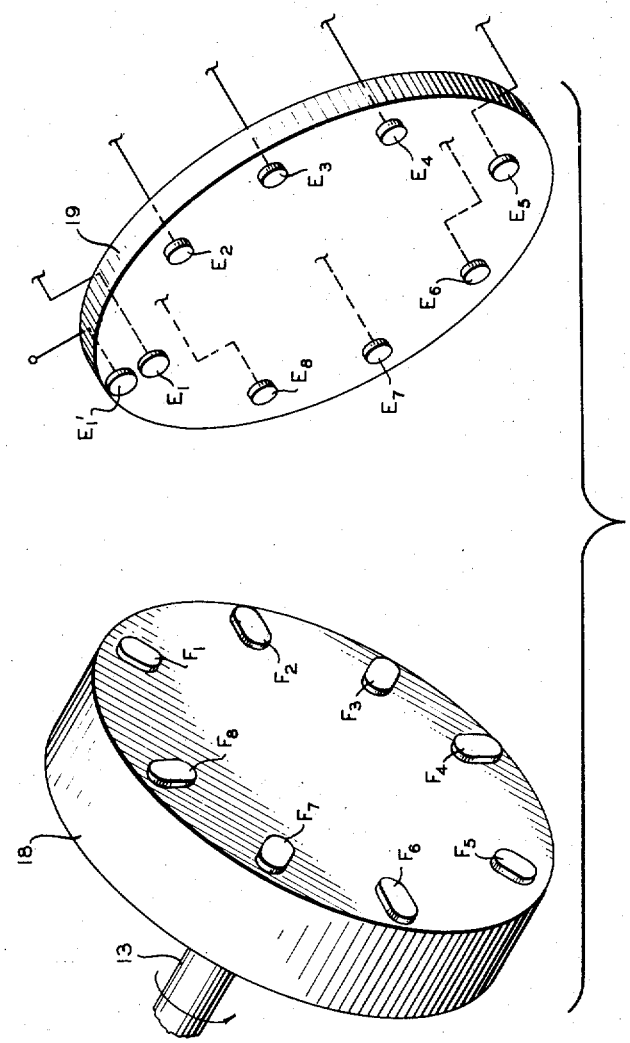
Figure 4 is a perspective view of the electrical signal storage and commutating means.
Figure 5:
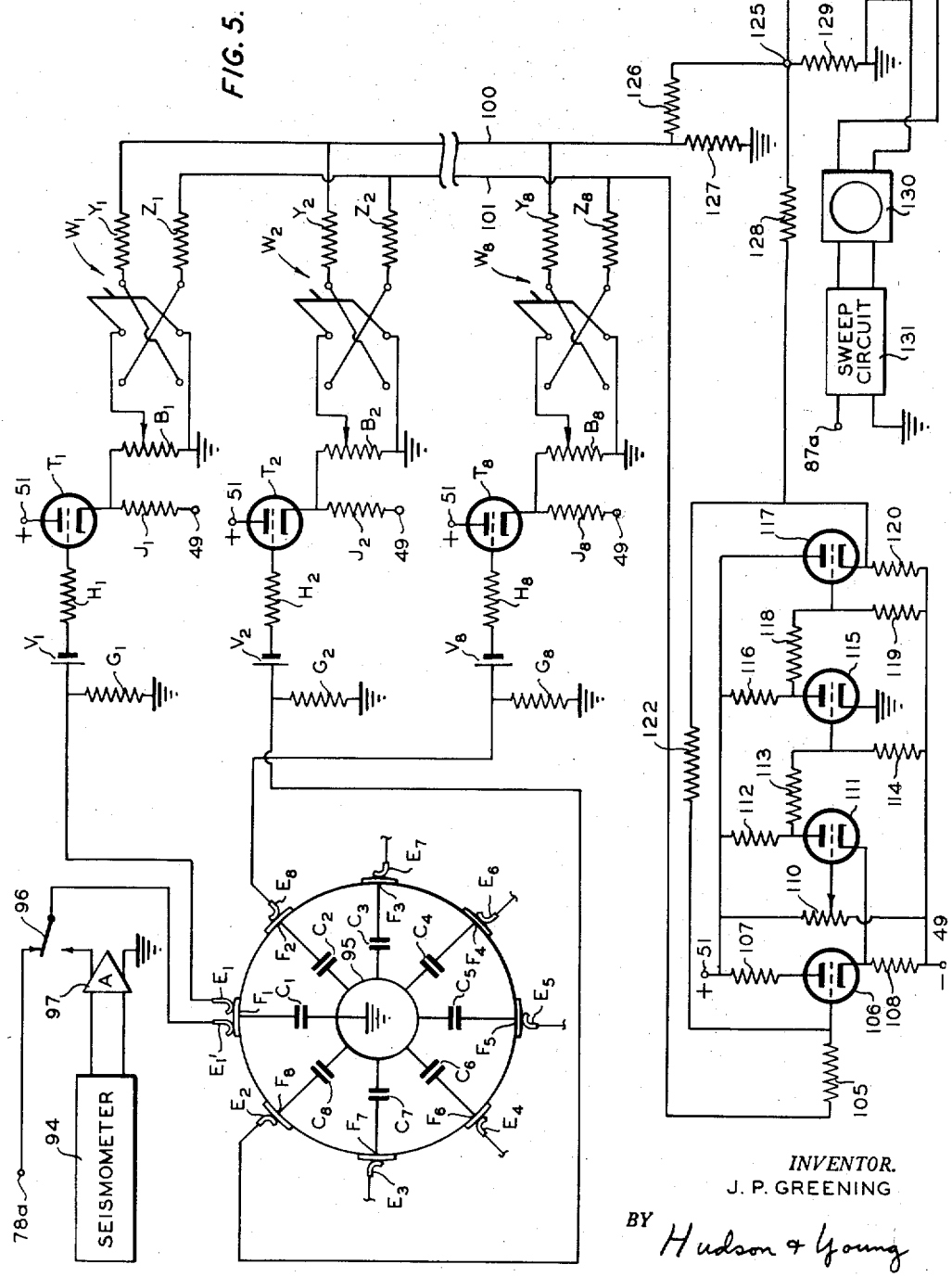
Figure 5 is a schematic circuit diagram of the signal storage and voltage multiplying circuit.

When it is desired to multiply two algebraic polynomials, the apparatus illustrated in Figures 3, 4 and 5 is employed in conjunction with that shown in Figure 2. Output terminal 34 of Figure 2 is connected to an input terminal 34a of Figure 3. Output terminal 35 of Figure 2 is connected to an input terminal 35a of Figure 3. Terminal 35a is connected through a resistor 45 to the control grid of a thyratron 46 and through a resistor 47 to ground. A resistor 48 is connected between terminal 35a and a negative potential terminal 49. The cathode of thyratron 46 is connected to ground through a resistor 50. The anode of thyratron 46 is connected to a positive potential terminal 51 through a resistor 52. The anode of thyratron 46 is also connected through a pair of series connected capacitors 54 and 55 to the anode of a triode 56. A capacitor 60 is connected between the anode and cathode of thyratron 46. The anode of triode 56 is connected through a resistor 57, which is shunted by a capacitor 58, to the control grid of a second triode 59. The junction between capacitors 54 and 55 is connected to ground through a resistor 61 and also to the anode of triode 59 through a capacitor 55a. The anode of triode 56 is connected to terminal 51 through a resistor 62, and the anode of triode 59 is connected to terminal 51 through a resistor 63. The anode of triode 59 is also connected to the control grid of triode 56 through a resistor 65 which is shunted by a capacitor 66. The control grids of triodes 56 and 59 are connected to ground through respective resistors 67 and 68. The cathodes of triodes 56 and 59 are connected to one another and to ground through a resistor 70 which is shunted by a capacitor 71.

The anode of triode 56 is connected through a resistor 72 to the control grid of a third triode 73. The cathode of triode 73 is connected to ground through a resistor 74, and the control grid of triode 73 is connected to terminal 49 through a resistor 75. The anode of triode 73 is connected to terminal 51 through the winding of a relay 76. The movable arm of relay 76 is connected to an output terminal 78. When the relay is energized, this arm engages a contact which is connected to an input terminal 34a; and when the relay is deenergized, this arm is connected to a grounded contact.

The junction between resistor 72 and the control grid of triode 73 is connected through a capacitor 80 to the control grid of a fourth triode 81. The cathode of triode 81 is connected to ground, and the anode of triode 81 is connected to terminal 51 through a resistor 82. The control grid of triode 81 is connected to ground through a pair of series connected resistors 84 and 85, the junction between resistors 84 and 85 being connected to terminal 49 through resistor 85a. The anode of triode 81 is connected to an output terminal 87 through a capacitor 88. Terminal 87 is connected to ground through a resistor 89.

Discs 18 and 19 are shown in disassembled relation in Figure 4. A plurality of electrical contacts $F_1, F_2, \ldots F_8$ is mounted in an annular path on the face of disc 18 adjacent disc 19. Electrical contacts $E_1, E_2, \ldots E_8$ are mounted in a corresponding annular path on the face of disc 19 to engage the contacts on disc 18 when disc 18 is rotated by shaft 13. Radially with $E_1$, but insulated from it, is mounted an input contact $E_1'$. Contacts $F_1, F_2, \ldots F_8$ are so shaped that each is contacted by contact $E_1'$ and electrical connection is made between contact $E_1'$ and $E_1$ as disc 18 is rotated.

A plurality of capacitors $C_1, C_2, \ldots C_8$ is mounted on or within disc 18. Corresponding first terminals of these capacitors are connected to respective contacts $F_1, F_2, \ldots F_8$. The second terminals of capacitors $C_1, C_2, \ldots C_8$ are connected to a ground point 95, which can be drive shaft 13, for example. Contacts $E_1, E_2, \ldots E_8$ of disc 19 are shown schematically in engagement with respective contacts $F_1, F_8, F_7, F_6, F_5, F_4, F_3,$ and $F_2$. Contacts $E_1, E_2, \ldots E_8$ are connected to the positive terminals of respective voltage sources $V_1, V_2, \ldots V_8$. The negative terminals of voltage sources $V_1, V_2, \ldots V_8$ are connected to the control grids of respective triodes $T_1, T_2, \ldots T_8$ through respective resistors $H_1, H_2, \ldots H_8$. Contacts $E_1, E_2, \ldots E_8$ are also connected to ground through respective resistors $G_1, G_2, \ldots G_8$. The anodes of triodes $T_1, T_2, \ldots T_8$ are connected to positive potential terminal 51. The cathodes of triodes $T_1, T_2, \ldots T_8$ are connected to negative potential terminal 49 through respective resistors $J_1, J_2, \ldots J_8$. Corresponding first end terminals of potentiometers $B_1, B_2, \ldots B_8$ are connected to the cathodes of respective triodes $T_1, T_2, \ldots T_8$, and corresponding second end terminals of potentiometers $B_1, B_2, \ldots B_8$ are connected to ground. The contactors and the second end terminals of potentiometers $B_1, B_2, \ldots B_8$ are connected to opposite blades of respective double-throw double-pole reversing switches $W_1, W_2, \ldots W_8$. Corresponding first output terminals of switches $W_1, W_2, \ldots W_8$ are connected to a lead 100 through respective resistors $Y_1, Y_2, \ldots Y_8$. Corresponding second output terminals of switches $W_1, W_2, \ldots W_8$ are connected to a lead 101 through respective resistors $Z_1, Z_2, \ldots Z_8$.

Lead 101 is connected through a resistor 105 to the control grid of a triode 106. The anode of triode 106 is connected to terminal 51 through a resistor 107, and the cathode of triode 106 is connected to terminal 49 through a resistor 108. The end terminals of a potentiometer 110 are connected to respective terminals 51 and 49. The contactor of potentiometer 110 is connected to the control grid of a triode 111. The cathode of triode 111 is connected to the cathode of triode 106, and the anode of triode 111 is connected through a resistor 112 to terminal 51. The anode of triode 111 is also connected through a resistor 113 to the control grid of a triode 115. The control grid of triode 115 is connected to terminal 49 through a resistor 114. The cathode of triode 115 is connected to ground, and the anode of triode 115 is connected through a resistor 116 to terminal 51. The anode of triode 115 is also connected to the control grid of a triode 117 through a resistor 118. The control grid of triode 117 is connected to terminal 49 through a resistor 119. The anode of triode 117 is connected to terminal 51, and the cathode of triode 117 is connected to terminal 49 through a resistor 120. The cathode of triode 117 is also connected to the control grid of triode 106 through a feedback resistor 122.

Lead 100 is connected to an output terminal 125 through a resistor 126 and to ground through a resistor 127. The cathode of triode 117 is connected to terminal 125 through a resistor 128. A resistor 129 is connected between terminal 125 and ground. The end terminals of resistor 129 are connected to the respective input terminals of an indicating device 130 which can be a cathode ray oscilloscope, the end terminals of resistor 129 being connected to a first set of deflection plates. The output terminals of a sweep circuit 131 are connected to the second deflection plates of oscilloscope 130. The input terminals of sweep circuit 131 are connected to ground and a terminal 87a, the latter being connected to output terminal 87 of Figure 3.

The operation of the computing mechanism of this invention can be described in conjunction with the multiplication of a first polynomial of the form:

$$a_0 + a_1 x + a_2 x^2 + a_3 x^3 + a_4 x^4 + a_5 x^5 + a_6 x^6 + a_7 x^7 \quad (3)$$

by a second polynomial of the form:

$$b_0 + b_1 x + b_2 x^2 + b_3 x^3 + b_4 x^4 + b_5 x^5 + b_6 x^6 + b_7 x^7 \quad (4)$$

to produce the following product:

$$a_0 b_0 + (a_1 b_0 + a_0 b_1) x + (a_2 b_0 + a_1 b_1 + a_0 b_2) x^2 + \\ (a_3 b_0 + a_2 b_1 + a_1 b_2 + a_0 b_3) x^3 + \\ (a_4 b_0 + a_3 b_1 + a_2 b_2 + a_1 b_3 + a_0 b_4) x^4 + \\ (a_5 b_0 + a_4 b_1 + a_3 b_2 + a_2 b_3 + a_1 b_4 + a_0 b_5) x^5 + \\ (a_6 b_0 + a_5 b_1 + a_4 b_2 + a_3 b_3 + a_2 b_4 + a_1 b_5 + a_0 b_6) x^6 + \\ (a_7 b_0 + a_6 b_1 + a_5 b_2 + a_4 b_3 + a_3 b_4 + a_2 b_5 + a_1 b_6 + a_0 b_7) x^7 + \\ (a_7 b_1 + a_6 b_2 + a_5 b_3 + a_4 b_4 + a_3 b_5 + a_2 b_6 + a_1 b_7) x^8 + \\ (a_7 b_2 + a_6 b_3 + a_5 b_4 + a_4 b_5 + a_3 b_6 + a_2 b_7) x^9 + \\ (a_7 b_3 + a_6 b_4 + a_5 b_5 + a_4 b_6 + a_3 b_7) x^{10} + (a_7 b_4 + a_6 b_5 + a_5 b_6 + \\ a_4 b_7) x^{11} + (a_7 b_5 + a_6 b_6 + a_5 b_7) x^{12} + \\ (a_7 b_6 + a_6 b_7) x^{13} + (a_7 b_7) x^{14} \quad (5)$$

It will be observed that in the mulitplication of two polynomials having eight terms each, for example, the product polynomial has fifteen terms.

With reference to Figure 2, the coefficients $a_0$, $a_1$, ... $a_7$ are established on respective potentiometers $A_1$, $A_2$, ... $A_8$. In corresponding manner, the coefficients $b_0$, $b_1$, ... $b_7$ are established on respective potentiometers $B_1$, $B_2$, ... $B_8$ in Figure 5. For purposes of description it will be assumed initially that all of the coefficients are positive. Thus, all of the switches $S_1$, $S_2$, ... $S_8$ are connected to positive lead 22 in Figure 2. The switches $W_1$, $W_2$, ... $W_8$ of Figure 5 are in the illustrated positions so that the contactors of potentiometers $B_1$, $B_2$, ... $B_8$ are connected to respective resistors $Y_1$, $Y_2$, ... $Y_8$. The voltages appearing at the contactors of the potentiometers $A_1$, $A_2$, ... $A_8$, taken with respect to ground, are thus proportional to the respective coefficients $a_0$, $a_1$, ... $a_7$. It is further assumed that the trigger circuit of Figure 3 is biased initially such that triode 59 is conducting and triode 56 is non-conducting. Triode 73 is also conducting so that relay 76 is energized to connect terminals 78 and 34a with one another.

At the beginning of the multiplication cycle, brush 37 is in engagement with contact $D_1$. This applies a potential representative of $a_0$ from potentiometer $A_1$ to contact $E_1'$ of disc 19, which potential is also applied to the control grid of triode $T_1$ through contact $E_1$. The output voltage from triode $T_1$ is applied across the end terminals of potentiometer $B_1$ such that the output voltage applied through switch $W_1$ is proportional to the product $a_0 b_0$. This voltage is in turn applied to indicator 130 through resistor $Y_1$ to form the first term of the product polynomial. It is assumed that the charges on condensers $C_2$, $C_3$, ... $C_8$ are zero at this time, which is designated as $t_0$. At time $t_1$, shaft 13 is rotated so that contacts, $F_1$, $F_2$, $F_3$ ... $F_8$ of disc 18 are in engagement with contacts $E_2$, $E_1$ $E_8$ ... $E_3$, respectively, and the voltage on capacitor $C_1$, which is representative of the coefficient $a_0$, is applied through contacts $F_1$ and $E_2$ to the control grid of triode $T_2$. The resulting voltage applied through switch $W_2$ is thus representative of the product $a_0 b_1$ because the contactor setting of potentiometer $B_2$ is representative of the coefficient $b_0$. At this time $t_1$, a potential representative of the coefficient $a_1$ is applied from potentiometer $A_2$ through brush 37 and contact $D_2$ to contact $E_1'$ to charge capacitor $C_2$. This same potential is also applied through contact $E_1$ to the control grid of triode $T_1$ so that the voltage applied through switch $W_1$ is representative of the product $a_1 b_0$. These two voltages representative of the products $a_0 b_1$ and $a_1 b_0$ are summed and applied to indicator 130 to form the second coefficient of the product polynomial. The same procedure continues as shaft 13 is rotated to establish in sequence the first eight terms of the product polynomial.

At time $t_7$, capacitor $C_1$ is adjacent contact $E_8$. During the following time interval when brush 37 is moving between contacts $D_8$ and $D_1$, brush 38 momentarily engages grounded contact 40 of Figure 2. The duration of this engagement can be of the order of six milliseconds, for example. With reference to Figure 3, thyratron 46 initially is non-conducting because of the negative bias applied to the control grid thereof from voltage terminal 49. Capacitor 60 is charged from positive terminal 51 at this time. The engagement of brush 38 with contact 40 results in the control grid of thyratron 46 being grounded momentarily. This is the equivalent of applying a positive pulse to the control grid of thyratron 46, and results in conduction taking place through the thyratron. Capacitor 60 is discharged by conduction through the thyratron; it begins to recharge at the instant that brush 38 leaves contact 40, at a rate that is slow compared to the contact time. The leading edge of this negative pulse at the anode of thyratron 46 is differentiated by capacitor 54 and resistor 61, and the sharpened negative pulse is applied to the control grid of triode 59 through capacitor 55 and resistor 57 and to the control grid of triode 56 through capacitor 55a and resistor 65. This negative pulse extinguishes conduction through triode 59. The potential on the anode of triode 59 is thereby suddenly increased, and this increased potential is applied to the control grid of triode 56 to cause triode 56 to conduct. The conduction through triode 56 lowers the potential on the anode thereof, and this lowered potential is applied through resistor 72 to the control grid of triode 73. This negative potential pulse extinguishes the conduction through triode 73 with the result that relay 76 is deenergized, thereby connecting terminal 78 to ground. Thus, during the second revolution of disc 18, contact $E_1'$ is maintained at ground potential so that capacitors $C_1$, $C_2$, ... $C_8$ are discharged sequentially as disc 18 completes its second revolution.

It can thus be seen that during the second revolution of drum 18, one additional capacitor is discharged each interval. This results in a diminishing number of terms in the coefficients of the product polynomial. From the above multiplication it can be seen that a maximum of eight terms comprise the coefficient of $x^7$, whereas the coefficient of $x^{14}$ is reduced to a single term. The sequential discharge of the capacitors of disc 18 provides this result.

When a cathode ray oscilloscope is employed as output indicator 130, it is desired that the sweep circuit be synchronized with the rotation of shaft 13. This is accomplished by starting the operation initially with brush 37 between contacts $D_8$ and $D_1$ of drum 16. Brush 38 is positioned to engage contact 40 prior to the time that brush 37 engages contact $D_1$. In this situation, it is assumed that triode 56 is conducting, whereas triodes 59, 73 and 81 are non-conducting. The engagement of contact 40 by brush 38 applies a positive pulse to thyratron 46 as previously described, which results in a negative pulse being applied through condenser 55a and resistor 65 to the control grid of triode 56. This extinguishes the current flow through triode 56 so that the potential on the anode thereof is increased, which results in a positive square wave being applied to the control grids of triodes 59 and 73. Triode 59 conducts to reset the circuit for the next pulse; triode 73 conducts to energize relay 76. The leading edge of the square wave at the control grid of triode 73 is differentiated by capacitor 80 and resistor 84 and the resulting positive pulse applied to the control grid of triode 81. The negative pulse at the anode of triode 81 is applied to the differentiating circuit comprising capacitor 88 and resistor 89, producing a sharp output pulse at output terminal 87 which triggers sweep circuit 131. At the end of one complete revolution of shaft 13, brush 38 engages contact 40 as described previously. This applies a negative pulse to the control grids of triodes 73 and 81, which deenergizes relay 76. The negative pulse has no effect on the operation of triode 81 which normally is non-conducting because of the negative bias applied to the control grid thereof from terminal 49 and the potential dividing network comprising resistors 85a and 85. Thus a synchronizing pulse is applied from terminal 87 to sweep circuit 131 once during each two complete revolutions of shaft 13.

Whenever any of the coefficients of the first polynomial to be multiplied has negative values, the corresponding potentiometer $A_1, A_2, \ldots A_8$ is connected to negative lead 23 by means of the associated S switch. Whenever any of the coefficients of the second polynomial to be multiplied has a negative value, such coefficient is set on its respective potentiometer $B_1, B_2, \ldots B_8$ by moving the associated W switch to the left-hand position such that the associated Z resistor is connected to the contactor of the B potentiometer. The voltage appearing at lead 101 is applied to the input of a phase reversal unity gain amplifier comprising triodes 106, 111, 115 and 117. The output voltage from this amplifier is of opposite sign to the voltage at lead 100. The two voltages are added by the summing network comprising resistors 126, 128 and 129. In this manner both positive and negative coefficients can readily be accommodated.

The summing amplifier comprising triodes 106, 111, 115 and 117 is a D. C. amplifier. If the input potential applied to the grid of triode 106 should increase, for example, the potential at the cathode of triode 106 also increases. This increased potential is applied to the cathode of triode 111 to decrease the gain thereof. The potential at the anode of triode 111 thus increases, and this increased potential is applied to the control grid of triode 115 to increase the gain thereof. The resulting decrease is potential at the anode of triode 115 decreases the gain of triode 117. The output of triode 117, taken from the cathode thereof, is also decreased in potential. Degenerative feedback resistor 122 reduces the gain of the amplifier. The circuit components are selected to give a unity gain to the amplifier.

The apparatus of this invention is particularly well adapted for use in interpreting seismic signals by means of a correlation function such as described in detail in the copending application of R. G. Piety, Serial No. 378,541, filed September 4, 1953. Briefly, this correlation is performed by multiplying continuously the output signal from a seismometer by a preselected wave form established on potentiometers $B_1, B_2, \ldots B_8$. This preselected wave form can be representative of a particular wave form which is to be recognized in the seismometer signal. The multiplication of two corresponding polynomials results in an output product which exhibits a maximum when the two signals are synchronized. Thus, by recording continuously the output voltage across resistor 129 it is possible to determine the time of arrival of a particular wave form in a seismic signal which may be obscured by random noise merely by observing a maximum in the recorded product. When the apparatus is employed in this manner, disc 16 is disconnected from the circuit by connecting a switch 96 to one output terminal of a seismometer amplifier 97, see Figure 5. The input to amplifier 97 is obtained from a seismometer 94. The pulsing circuit of Figure 3 is not employed because the output of the seismometer is multiplied continuously by the predetermined polynomial set on potentiometer $B_1, B_2, \ldots B_8$. Although capacitors are shown in Figure 5 for use as signal storage elements, other devices such as magnetic storage means can be used for this purpose.

While this invention has been described in conjunction with a present preferred embodiment, it should be apparent that the invention is not limited thereto.

What is claimed is:

1. Apparatus for multiplying algebraic polynomials comprising, in combination, means for establishing an electrical signal, the amplitude of which varies with respect to time in accordance with the coefficients of one of the polynominals to be multiplied; a plurality of voltage multiplying means, there being at least as many multiplying means as coefficients of the second polynomial to be multiplied, the first polynomial to be multiplied being of no higher order than the second polynomial; a plurality of signal storage means, there being one storage means for each of said multiplying means; first means to apply said electrical signal successively to said storage means so that the first of said storage means receives the first portion of said signal and the remainder of said storage means receive portions of said signal at respective later times; a plurality of signal reproducing means to remove signals from said storage means, there being one of said reproducing means for each of said multiplying means, said reproducing means being connected to the inputs of respective ones of said multiplying means; means for moving said storage means relative to said reproducing means so that each of said storage means engages each of said reproducing means sequentially and repetitively in one cycle; means to sum the outputs of said multiplying means; means to disengage said first means from said storage means after the first of said storage means engages each of said reproducing means; and means to remove the signal from each of said storage means after engagement thereof with each of said reproducing means.

2. The combination in accordance with claim 1 wherein said means to disengage and said means to remove comprise a source of a second signal of magnitude representative of zero with respect to said first-mentioned signal, and switching means actuated by movement of said storage means relative to said reproducing means through a complete cycle to connect said source of second signal in place of said first-mentioned signal to said first means.

3. The combination in accordance with claim 2 wherein said switching means comprises a pulse generating means, means energizing said pulse generating means once each of said cycles, a relay, and means responsive to the output of said pulse generating means to energize and deenergize said relay on alternate output pulses from said pulse generating means, and means actuated by alternate output pulses of said pulse generating means to provide a timing pulse.

4. The combination in accordance with claim 1 wherein said plurality of storage means comprise a rotatable drum; a plurality of capacitors mounted on said drum, means connecting corresponding first terminals of said capacitors to a point of reference potential, a plurality of electrical contacts mounted on a face of said drum, there being a contact for each of said capacitors, and means connecting the second terminals of said capacitors, respectively, to said contacts; and said reproducing means comprises a plurality of brushes spaced about said face of said drum to engage said contacts when said drum is rotated.

5. The combination in accordance with claim 1 wherein said means to establish an electrical signal comprises a plurality of potentiometers, one for each of the coefficients of said first polynomial, a plurality of switching means to apply voltages of selected polarities across said potentiometers, an output terminal, and commutating means to connect the contactors of said potentiometers sequentially to said output terminal.

6. The combination in accordance with claim 1 wherein said plurality of voltage multiplying means comprises a plurality of amplifiers, means connecting the input terminals of said amplifiers, respectively, to said reproducing means, a plurality of potentiometers, said potentiometers being connected across the output terminals of respective ones of said amplifying means, first and second output terminals, and means to connect the contactors of said potentiometers selectively to said first and second output terminals.

7. The combination in accordance with claim 6 wherein said means to sum the outputs of said multiplying means comprises a phase inversion network, means connecting said second output terminal to one input terminal of said network, a voltage indicating means, and means connecting said first output terminal and one output terminal of said network to one input terminal of said voltage indicating means, the second input terminal of said voltage indicating means being maintained at the same potential as one end terminal of said potentiometers and the second input and output terminals of said network.

8. Apparatus for detecting the presence of a predetermined wave form in the output signal of a seismometer, comprising, a seismometer to provide an output electrical signal, the amplitude of which varies with respect to time in accordance with the magnitude of vibrations received thereby; a plurality of voltage multiplying means, the settings of said multiplying means being adjusted in accordance with respective sequential amplitude values of the predetermined wave form to be detected; a plurality of signal storage means, there being one storage means for each of said multiplying means; means to apply said electrical signal successively to said storage means whereby the first of said storage means receives the first portion of said signal and the remainder of said storage means receives portions of said signal at respective later times; a plurality of signal reproducing means to remove signals from said storage means, there being one of said reproducing means for each of said multiplying means, said reproducing means being connected to the respective inputs of said multiplying means; means for moving said storage means relative to said reproducing means whereby each of said storage means engages said reproducing means sequentially and repetitively; and means to sum the outputs of said multiplying means.

9. The combination in accordance with claim 8 wherein said plurality of voltage multiplying means comprises a plurality of amplifiers, means connecting the input terminals of said amplifiers, respectively, to said reproducing means, a plurality of potentiometers, said potentiometers being connected across the output terminals, respectively, to said amplifiers, first and second output terminals, and means to connect the contactors of said potentiometers selectively to said first and second output terminals.

10. The combination in accordance with claim 9 wherein said means to sum the outputs of said multiplying means comprises a phase inversion network, means connecting said second output terminal to one input terminal of said network, a voltage indicating means, and means connecting said first output terminal and one output terminal of said network to one input terminal of said voltage indicating means, the second input terminal of said voltage indicating means being maintained at the same potential as one end terminal of said potentiometers and the second input and output terminals of said network.

11. Apparatus for multiplying algebraic polynomials comprising, in combination, a rotatable drive shaft, means positioning a plurality of first electrical contacts in spaced relation about said shaft, a plurality of potentiometers, means applying voltages across said potentiometers, corresponding first end terminals of said potentiometers being maintained at a common potential, the contactors of said potentiometers being connected, respectively, to said first contacts, a first brush carried by said shaft to engage said first contacts sequentially, a disk mounted on said shaft, a plurality of second electrical contacts mounted on one face of said disk in spaced relation about said shaft, a plurality of capacitors mounted on said disk, first end terminals of said capacitors being connected to a point of reference potential and second end terminals of said capacitors being connected, respectively, to said second contacts, means positioning a plurality of third electrical contacts adjacent said one face to be engaged by said second contacts sequentially when said disk is rotated, means connecting said first brush to one of said third contacts, a plurality of voltage multiplying means, first input terminals of said voltage multiplying means being connected to respective ones of said third contacts, second input terminals of said voltage multiplying means being connected to said common potential, means to sum the outputs of said voltage multiplying means, a fourth electrical contact spaced from said shaft and maintained at said common potential, a second brush carried by said shaft to engage said fourth contact once each revolution of said shaft, and means responsive to said second brush engaging said fourth contact to connect said one of said third contacts to said common potential during alternate revolutions of said shaft.

References Cited in the file of this patent

UNITED STATES PATENTS

| | | |
|---|---|---|
| 1,838,647 | Watters | Dec. 29, 1931 |
| 2,262,235 | Hofgaard | Nov. 11, 1941 |
| 2,394,924 | Luhn | Feb. 12, 1946 |
| 2,425,405 | Vance | Aug. 12, 1947 |
| 2,668,661 | Stibitz | Feb. 9, 1954 |
| 2,679,356 | Briers | May 25, 1954 |
| 2,794,965 | Yost | June 4, 1957 |

OTHER REFERENCES

Royal Aircraft Establishment Tech. Note No. G. W. 225 (Stoneman) Dec. 1952.

Electronic Analog Computers, Korn & Korn, McGraw-Hill Book Co., 1952, Figure 6.31a.